(12) United States Patent
Gupta et al.

(10) Patent No.: US 10,853,640 B2
(45) Date of Patent: Dec. 1, 2020

(54) METHOD AND SYSTEM FOR EXTRACTING INFORMATION FROM HAND-MARKED INDUSTRIAL INSPECTION SHEETS

(71) Applicant: Tata Consultancy Services Limited, Mumbai (IN)

(72) Inventors: Gaurav Gupta, Gurgaon (IN); Swati, Gurgaon (IN); Monika Sharma, Gurgaon (IN); Lovekesh Vig, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/938,806

(22) Filed: Mar. 28, 2018

(65) Prior Publication Data

US 2019/0272420 A1 Sep. 5, 2019

(30) Foreign Application Priority Data

Nov. 7, 2017 (IN) .............................. 201721039681

(51) Int. Cl.
*G06K 9/00* (2006.01)
*G06K 9/62* (2006.01)

(52) U.S. Cl.
CPC ..... *G06K 9/00469* (2013.01); *G06K 9/00456* (2013.01); *G06K 9/00463* (2013.01); *G06K 9/6261* (2013.01); *G06K 9/6271* (2013.01); *G06K 9/6298* (2013.01)

(58) Field of Classification Search
CPC ........... G06K 9/00442; G06K 9/00449; G06K 9/00456; G06K 9/00463; G06K 9/00469; G06K 9/00476; G06K 9/00483; G06K 2009/00489; G06K 9/626; G06K 9/6261
USPC ........ 382/113, 100, 173, 175–180, 291–292, 382/195, 192, 201–202
See application file for complete search history.

(56) References Cited

U.S. PATENT DOCUMENTS

| | | | |
|---|---|---|---|
| 6,108,444 A | 8/2000 | Syeda-Mahmood | |
| 2005/0190405 A1 | 9/2005 | Tomita | |
| 2006/0029296 A1* | 2/2006 | King | H04N 1/00244 382/313 |
| 2006/0098899 A1* | 5/2006 | King | G06F 17/218 382/305 |
| 2014/0149077 A1 | 5/2014 | Lee et al. | |
| 2014/0168716 A1* | 6/2014 | King | G06F 16/5846 358/473 |
| 2017/0109578 A1* | 4/2017 | Bednarowicz | G06K 9/00476 |
| 2018/0032806 A1* | 2/2018 | Prebble | G06K 9/00469 |

* cited by examiner

*Primary Examiner* — Dwayne D Bost
*Assistant Examiner* — Stephen M Brinich
(74) *Attorney, Agent, or Firm* — Finnegan, Henderson, Farabow, Garrett & Dunner LLP

(57) ABSTRACT

This disclosure relates generally to document processing, and more particularly to extracting information from hand-marked industrial inspection sheets. In an embodiment, the system performs localization of text as well as arrows in the inspection sheet, and identifies text that matches each arrow. Further by identifying machine zone each arrow is pointing to, the system assigns corresponding text to the appropriate machine zone; thus facilitating digitization of the inspection sheets.

17 Claims, 15 Drawing Sheets

US 10,853,640 B2

METHOD AND SYSTEM FOR EXTRACTING INFORMATION FROM HAND-MARKED INDUSTRIAL INSPECTION SHEETS

PRIORITY CLAIM

This U.S. patent application claims priority under 35 U.S.C. § 119 to: India Application No. 201721039681, filed on Jul. 11, 2017. The entire contents of the aforementioned application are incorporated herein by reference.

TECHNICAL FIELD

This disclosure relates generally to document processing, and more particularly to extracting information from hand-marked industrial inspection sheets.

BACKGROUND

In industries, especially in heavy industries, inspection of heavy machinery is carried out manually. The user who inspects the machineries carries inspection sheets containing line diagram of different machines being inspected, and manually notes down comments. It is a common practice that the user, while marking comments against different components of a machinery being inspected, puts an arrow pointing towards the component in the line diagram in the inspection sheet, and then writes corresponding comments.

The inventors here have recognized several technical problems with such conventional systems, as explained below. For example, consider that inspection is to be carried out in an industry in which multiple machines are used. Maintaining inspection sheets corresponding to inspection of all the machines is a cumbersome task, especially while considering the fact that the inspection may be performed multiple times over a period of time. Further, as the data is manually penned down on the inspection sheets, extracting data from these inspection sheets is difficult as the data is in unstructured format. When data extraction becomes difficult, data digitization becomes difficult.

SUMMARY

Embodiments of the present disclosure present technological improvements as solutions to one or more of the above-mentioned technical problems recognized by the inventors in conventional systems. For example, in one embodiment, a processor-implemented method is provided. Initially, an inspection sheet is collected as input, via one or more hardware processors, by a document digitization system. Further, a component localization of one or more line diagrams in the inspection sheet is performed, by the document digitization system, wherein the component localization involves identification and classification of different machine zones in the one or more line diagrams. Further, an arrow head-tail localization of the one or more line diagrams in the inspection sheet is performed, via the one or more hardware processors, by the document digitization system, wherein the arrow head-tail localization involves identifying arrow head and tail points in the inspection sheet, for all arrows present in the inspection sheet. Further, text detection in the inspection sheet is performed by the document digitization system, wherein the text detection involves detection of all texts in the inspection sheet, and position of identified text with respect to one or more clusters in the inspection sheet. Further, a text to arrow mapping is performed using one or more hardware processors by the document digitization system, wherein the text to arrow mapping is based on the identified head and tail points of arrows and position of cluster in which the text is present. Further, a zone to arrow mapping is performed via one or more hardware processors, by the document digitization system, wherein the zone to arrow mapping is based on the identified head and tail points of arrows and machine zones identified during the component localization. Finally, the document digitization system identifies text corresponding to different machine zones, based on result of the text to arrow mapping and zone to arrow mapping, via the one or more hardware processors.

In another embodiment, a document digitization system is provided. The system comprises of a processor; and a memory module comprising a plurality of instructions. The plurality of instructions are configured to cause the processor to collect an inspection sheet as input, via one or more hardware processors, by an Input/Output (I/O) module of the document digitization system. Further, a component localization module of the document digitization system performs a component localization of one or more line diagrams in the inspection sheet, wherein the component localization involves identification and classification of different machine zones in the one or more line diagrams. Further, an arrow localization module of the document digitization system performs an arrow head-tail localization of the one or more line diagrams in the inspection sheet, wherein the arrow head-tail localization involves identifying arrow head and tail points in the inspection sheet, for all arrows present in the inspection sheet. Further, a text detection module of the document digitization system performs text detection in the inspection sheet, wherein the text detection involves detection of all texts in the inspection sheet, and position of identified text with respect to one or more clusters in the inspection sheet. Further, a mapping module of the document digitization system performs a text to arrow mapping, wherein the text to arrow mapping is based on the identified head and tail points of arrows and position of cluster in which the text is present. The mapping module further performs a zone to arrow mapping, wherein the zone to arrow mapping is based on the identified head and tail points of arrows and machine zones identified during the component localization. The mapping module further identifies text corresponding to different machine zones, based on result of the text to arrow mapping and zone to arrow mapping.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
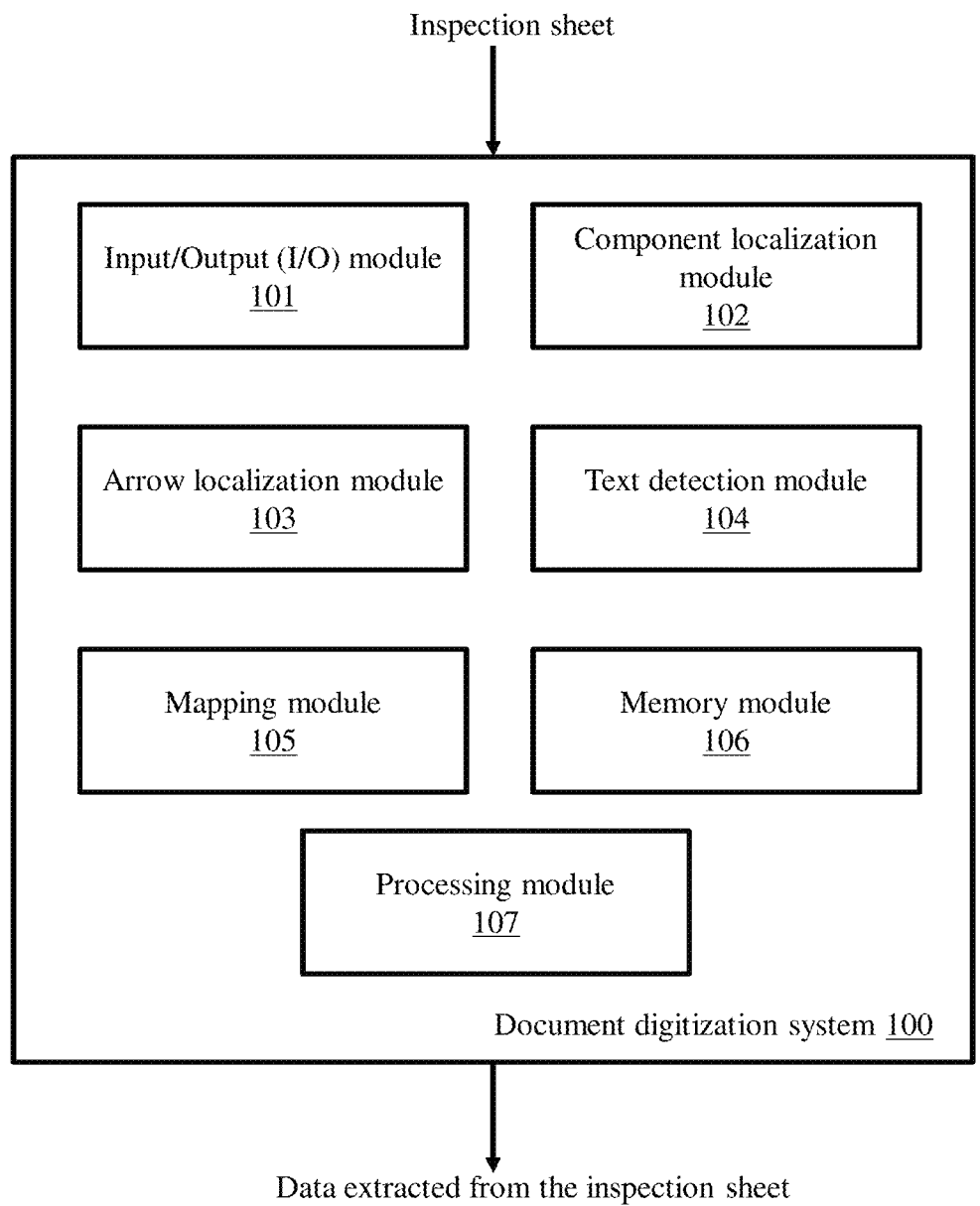
FIG. 1 illustrates an exemplary block diagram depicting components of document digitization system, according to some embodiments of the present disclosure.

FIG. 1 illustrates an exemplary block diagram depicting components of document digitization system, according to some embodiments of the present disclosure. The document digitization system 100 requires to identify contents (such as text, machine zones, arrows) present in an inspection sheet and then identify relationship between the identified contents, before extracting the contents/information, for accuracy of data. Once extracted, then the information can be digitized.

The document digitization system 100 includes an Input/Output (I/O) module 101, a component localization module 102, an arrow localization module 103, a text detection module 104, a mapping module 105, a memory module 106, and a processing module 107.

The I/O module 101 is configured to provide at least one communication interface for the document digitization system 100 to establish communication with at least one external entity. Here, the term 'external entity' can refer to any device/system that needs to communicate with the document digitization system 100 for the purpose of digitizing a document and/or for providing the digitized data to one or more external entities. In an embodiment, the term 'document' herein refers to an inspection sheet. In other embodiments, any document with structure similar to that of an inspection sheet and which contains information in similar data structure also can be processed using the document digitization system 100. The I/O module 101 can be further configured to provide appropriate communication channels with appropriate communication protocols, so as to facilitate communication between different components of the document digitization system 100.

Figure 9A:
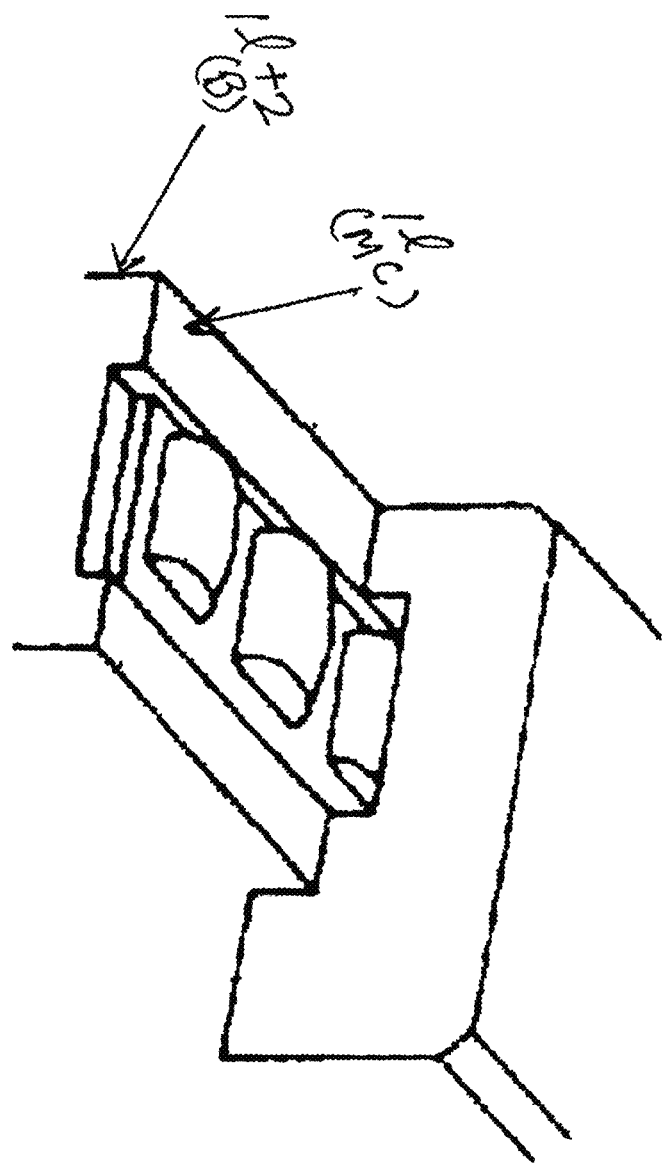
FIGS. 9a and 9b are example diagram depicting model used for component localization, according to some embodiments of the present disclosure.
Figure 9B:
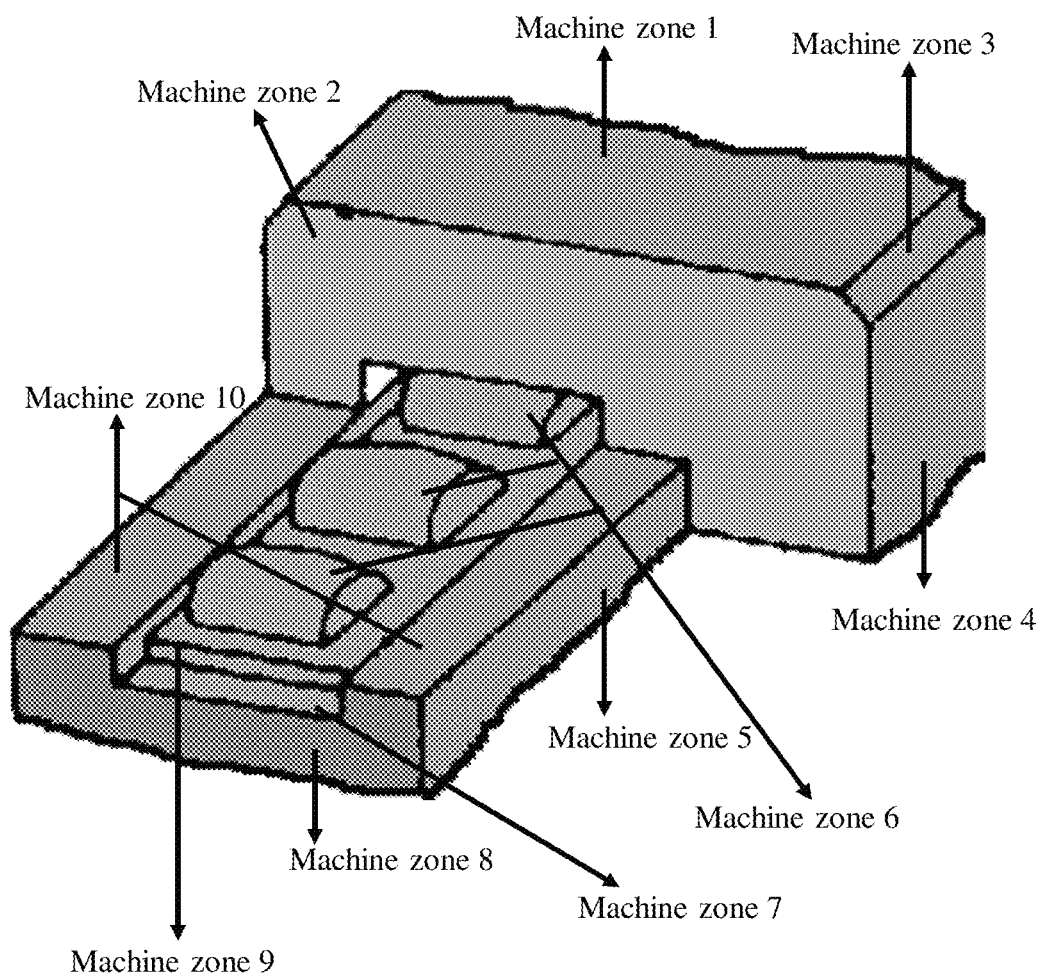

The component localization module 102 is configured to process the inspection sheet collected as input, to perform a component localization of all line diagrams present in the inspection sheet being processes. The component localization is used to identify machine zones in the line diagrams of machines (as depicted in FIG. 9a), present in the inspection sheet. Here, the 'machine zones' can refer to different parts/components of the machine (as depicted in FIG. 9b) as defined for the purpose of inspection. The component localization module 102 performs the component localization, by using a template matching technique. The memory module 106 possesses template sheets, at least one corresponding to each machine being inspected, and in each template sheet, machine zones as marked as contours. During the template matching, the component localization module 102 initially fetches the template sheets from the memory module 106, and compares the inspection sheet with the template sheets. Any suitable technique such as sliding window protocol can be used for comparing the documents. Upon identifying a match, the component localization module 102 shortlists that particular template sheet, and further performs a pixel level comparison of the inspection sheet and the shortlisted template sheet. As the template sheet has machine zones marked as contours, by virtue of the pixel level comparison, the component localization module 102 identifies machine zones in the inspection sheet. In the pixel-level analysis, the component localization module 102 calculates cross correlation metric and then maximizes it over all rows and columns of the inspection sheet. For the purpose of comparison, the component localization module 102 may assume highest correlation point ($I_k$) as top left coordinate of machine diagram given in the inspection sheet, and finds contours of corresponding machine zones ($Z_k$) based on $I_k$ by:

$$Z_k = C_k + I_k \qquad (1)$$

where $C_k$ is contours of machine zones in template image

Figure 8:
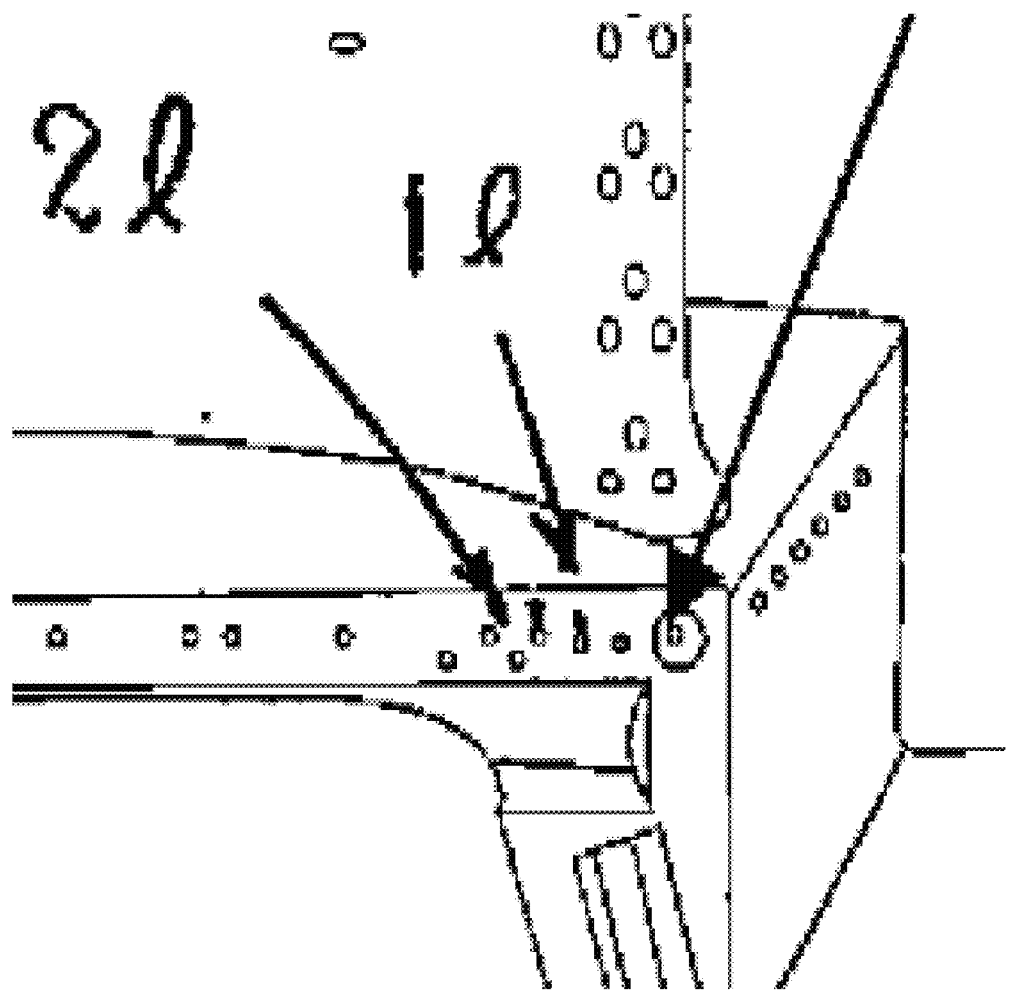
FIG. 8 is an example diagram depicting use of arrows to connect text and machine zones in an inspection sheet, according to some embodiments of the present disclosure.

The arrow localization module 103 performs arrow localization to identify head and tail points of each arrow present in the inspection sheet. In the inspection sheet, arrows serve as the connecting entities mapping text segments to corresponding machine zone (as depicted in FIG. 8). In this case, arrow head would be pointing towards the machine zone, and the corresponding text would be present near tail point of the arrow. In order to perform the arrow localization on handwritten arrows in the inspection sheet, the arrow localization module 103 initially uses a deep neural network model to learn arrow structure. This step further involves:

1. Identifying Regions of Interest (ROI) in the inspection sheet
2. Localizing arrow head and tail points The ROI consists of a rectangular boundary around all arrows in the inspection sheet. ROIs in the inspection sheet are identified based on a faster Region based Convolution Neural network (RCNN) model, which is generated by training the model on multiple inspection sheets from set of training images. In some scenarios, arrows lie very close to each other, which results in more than one arrow being present in a single ROI. As this can cause confusion while performing the arrow localization, in order to circumvent this issue, the faster RCNN model is trained on partial arrows, wherein 'partial arrow' refers to arrow head and part of shaft attached to the arrow head. Another reason for selecting the partial arrows are, low variation in size of ROIs. As a result the number of proposals generated will be higher for this size, which in turn increase the recall rate for proposal detection. For training, the Faster-RCNN is trained on the manually annotated arrow images from the complete training set using the Zeiler-Fergus network with random weight initialization. It is trained till maximum validation accuracy.

Figure 10:
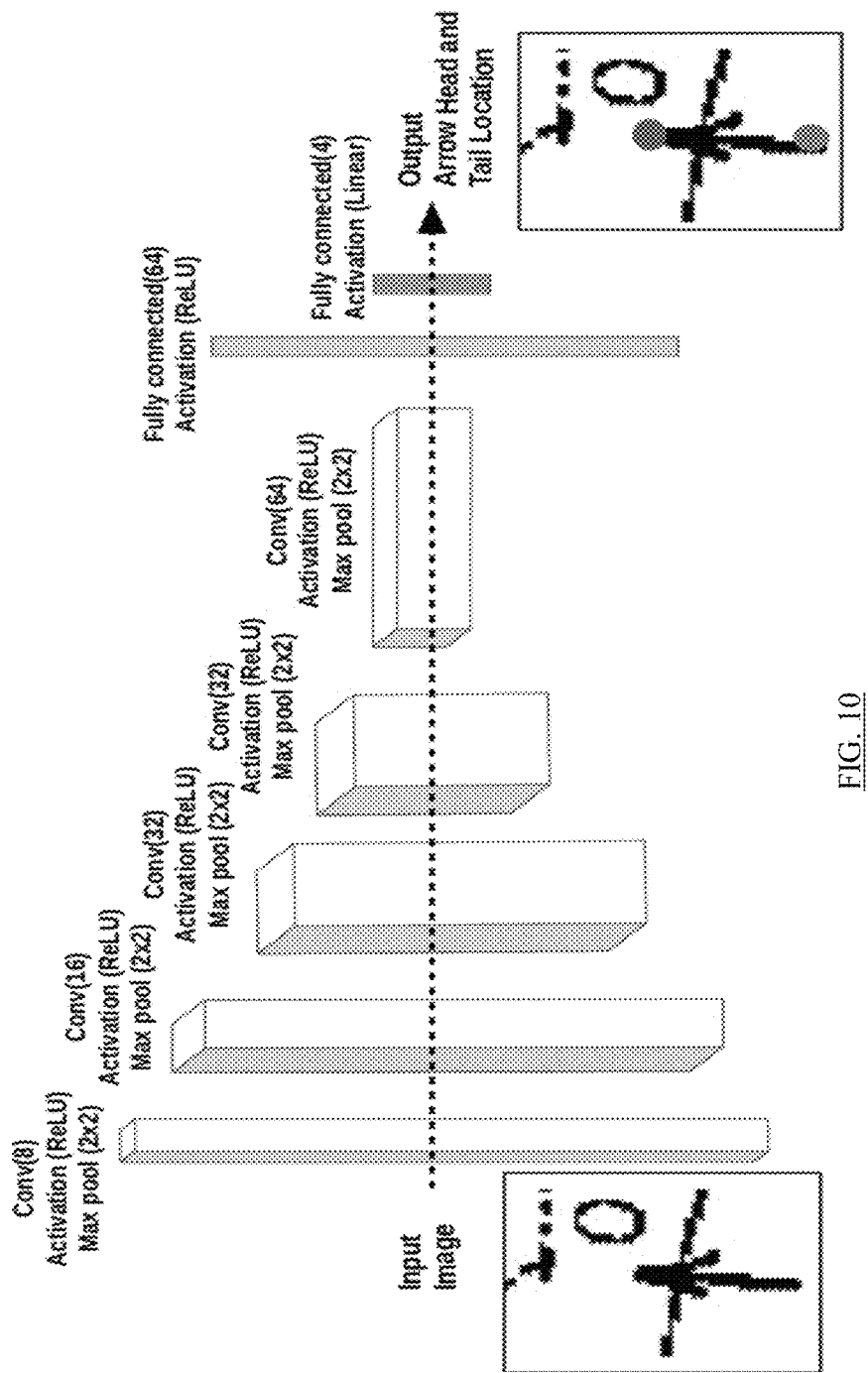
FIG. 10 is example diagram depicting model used for arrow localization, according to some embodiments of the present disclosure.

After identifying the ROIs, the arrow localization module 103 performs localization of head and tail points for the arrows in the identified ROIs. In an embodiment, the arrow localization module 103 uses a deep Convolution Neural Network (CNN) based regression model to detect the arrow head and tail points. The regression model predicts pixel locations of arrow head and tail points in the inspection sheet, and based on this, the arrow localization module 103 detects end points of partial arrows and direction in which the arrow is pointing. For training this deep Convolution Neural Network (CNN), cropped images of partial arrows, taken from a training set comprising arrow images from multiple inspection sheets are used. In an example implementation scenario, consider that there are a total of 1000 arrow images, which are divided randomly into 800 and 200 sets for training and validation, respectively. The model comprises of 5 convolution layers with 8, 16, 32, 32 and 64 filters respectively, followed by 2 fully connected layers (as depicted in FIG. 10). Each layer except the last fully connected layer may use Rectified Linear Units (ReLU) as their activation function. Each convolution layer is followed by a Max-pool layer of size 2×2. Each convolution layer uses 3×3 kernel sized filters. The last fully connected layer has 4 hidden units representing x and y location of the arrow head and tail, and it can use any suitable linear activation function. For example, the linear activation function used is Adam optimizer with default hyper-parameters to optimize mean square error cost unction. Number of epochs used in training is 500, which is where highest validation accuracy is achieved by the arrow localization module 103. Also assume that input size of image is 150×150.

Figure 11A:
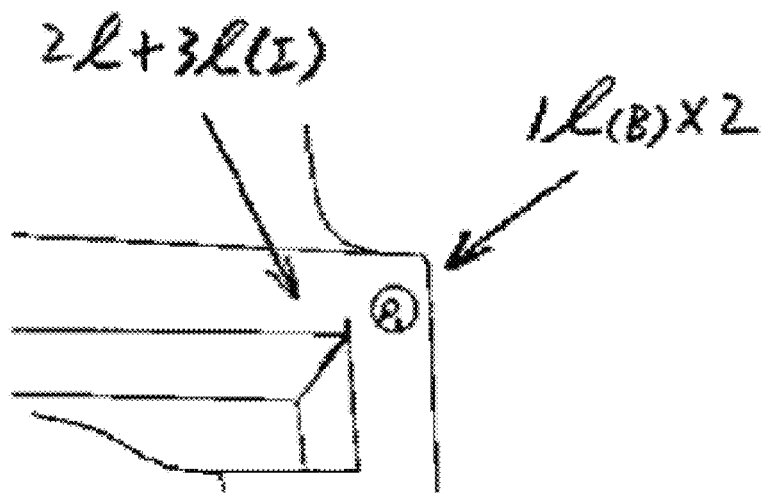
FIGS. 11a to 11e are example diagrams depicting stages of text detection, according to some embodiments of the present disclosure.
Figure 11B:
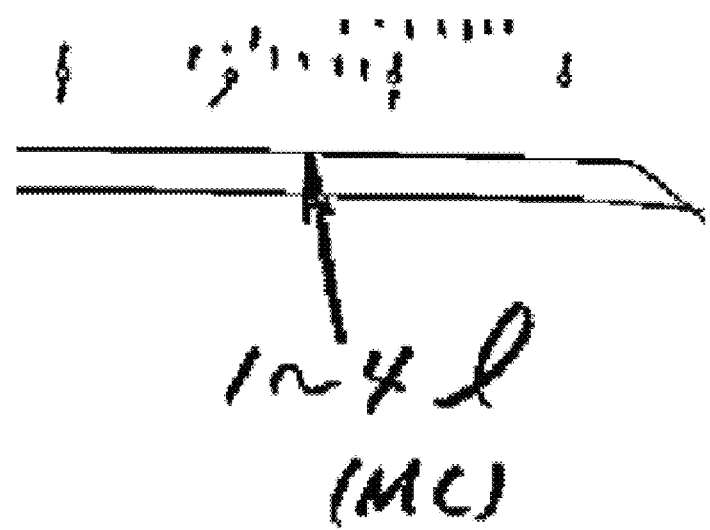

The text detection module 104 is configured to perform a text localization so as to detect texts in the inspection sheet being processed. All inspection sheets would have some standard data which can be discarded while performing the text localization. For example, all inspection sheets being in a standard format can have some common information in place, which are irrelevant and repeated objects. Such contents are to be removed from the inspection sheet before performing the text detection, so as to improve accuracy of the text detection. The text detection module 104 removes the unwanted information using background subtraction, which in turn is achieved by virtue of template matching. In this step, the text detection module 104 subtracts the template sheet identified as matching the inspection sheet, from the inspection sheet; leaving behind only the contents added by the user (for example, refer to the text and arrows in FIG. 11a), in the inspection sheet. After performing the background subtraction, the text detection module 104 removes noise (as in FIG. 11b) from the inspection sheet, by using appropriate means. For example, the text detection module 104 may rely on a morphological operation of median filter for removing the noise from the inspection sheet.

Figure 11C:
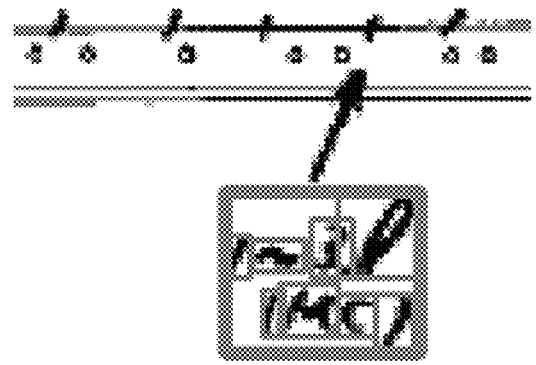
Figure 11D:
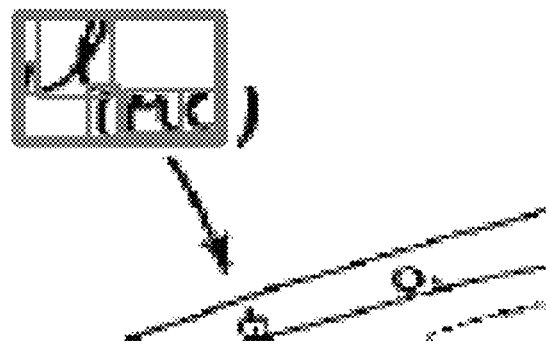
Figure 11E:
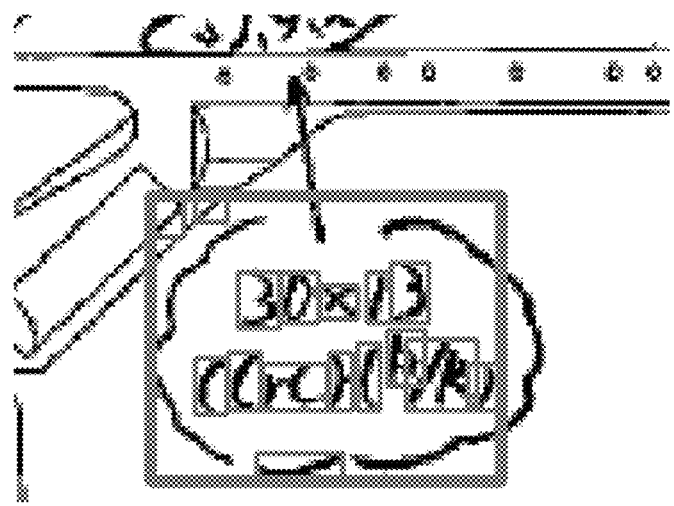

After removing the noise, the text detection module 104 identifies Bounding Boxes (BB) (as in FIGS. 11c to 11e) for all text segments and objects present in the inspection sheet. The text detection module 104 may use any suitable algorithm such as but not limited to 'connected component analysis' for the purpose of identifying the BBs in the inspection sheet. BB are present when the text and/or objects lie adjacent to each other, thus resulting more than one text and/or object present in a single box (in other words, presence of overlapping regions). Once identified, the overlapping regions are removed using a suitable algorithm such as but not limited to Non-Maximum Suppression (NMS). The text detection module 104 then detects text from area of the identified BB, based on pre-defined upper and lower threshold in terms of pixel values. In an embodiment, the threshold values are empirically defined.

Figure 12:
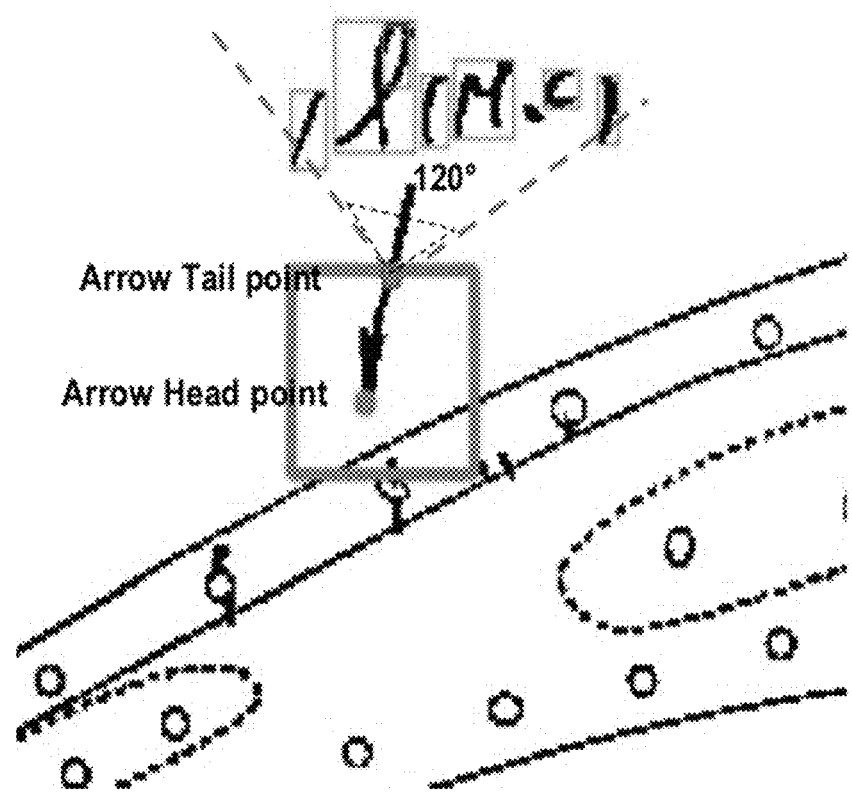
FIG. 12 is example diagram depicting text to arrow mapping, according to some embodiments of the present disclosure.

The mapping module 105 is configured to perform text to arrow mapping, zone to arrow mapping, and text to zone mapping. The processes are explained below:

a. Text to Arrow Mapping:

The text to arrow mapping is performed to identify text corresponding to all arrows in the inspection sheet. The mapping module 105 performs the text to arrow mapping at least based on head and tail points as well as direction, of arrows identified during arrow localization, and text segments identified by the text detection module 104. One observation from the inspection sheets is that text is generally located close to tail point of each arrow. This observation is used as baseline for identifying text associated with each arrow. In this process, the mapping module 105 considers text present in clusters close to tail point of each arrow, and checks distance between the tail point and the texts being considered. Threshold values in terms of distance of text from tail points or arrows are pre-defined and stored in appropriate database in the memory module 106. In addition to the threshold values of distance, information pertaining to a region with respect to the tail point (in terms of degree) also is defined and stored in the database in the memory module 106. For example (as in FIG. 12), texts present in only those clusters which are present in a sector of 120 degree (symmetrically around the line of arrow) with respect to the arrow tail is considered. The value '120 degree' is meant to be only an example, and can change as per requirements. If multiple clusters identified in the sector being considered, the closest one is selected by the mapping module 105, and the corresponding text is selected and assigned to the arrow.

b. Zone to Arrow Mapping:

In the text to arrow mapping, the text corresponding to each arrow in the inspection sheet are identified. Now, in order to understand which machine zone each of the identified arrows are related to, the text to zone mapping is performed by the mapping module 105. In this process, the mapping module 105 maps the head and tail point information of each arrow against the machine zones and contours identified during the machine localization. In this comparison, the mapping module 105 checks if the head point of the arrow lies inside any zone or is touching borders of any zone. If the head point is identified as not in any zone nor is touching boundary of any zone, the mapping module 105 extrapolates the arrow in a direction pointed by the arrow, until the head point is in a zone or at least touches boundary of a zone. In an embodiment, the mapping module 105 extrapolates the arrow in steps. If the head point is at (xh, yh), unit vector in arrow head direction is (μ, u), then next extrapolation point is given as:

$$(x_1, y_1) = (x_h, y_h) + \alpha(\mu, u) - (2)$$

where α is step size

Based on value of α, number of steps required for the head point to reach a zone varies. In an embodiment, value of 'α' is selected as average distance between center and boundary point of a minimum area zone contour in the inspection sheet.

c. Zone to Text Mapping:

Now by performing the zone to arrow mapping and the text to arrow mapping, the mapping module 105 has identified machine zone as well as text associated with each arrow in the inspection sheet. The mapping module 105 then identifies the text corresponding to each machine zone, by directly comparing the results of the zone to arrow mapping and the text to arrow mapping. The results are then presented to the user, and is also stored in appropriate database in the memory module 106, for future reference purpose.

The memory module 106 can be configured to store any information associated with the document digitization process, permanently or temporarily, as per requirements. The memory module 106 can be configured to host one or more databases to store the data as needed. The memory module 106 can be further configured to provide data on request, to other components of the document digitization system 100, and also to a user, preferably after validating the data access request.

The processing module 107 is configured to provide one or more hardware processors for the purpose of executing one or more actions in response to instructions received from the other components of the document digitization system 100. The processing module 107 is configured to be in communication with the other modules, receive instruction to execute one or more actions, and accordingly allocate one or more hardware processors to execute the action.

Figure 2A:
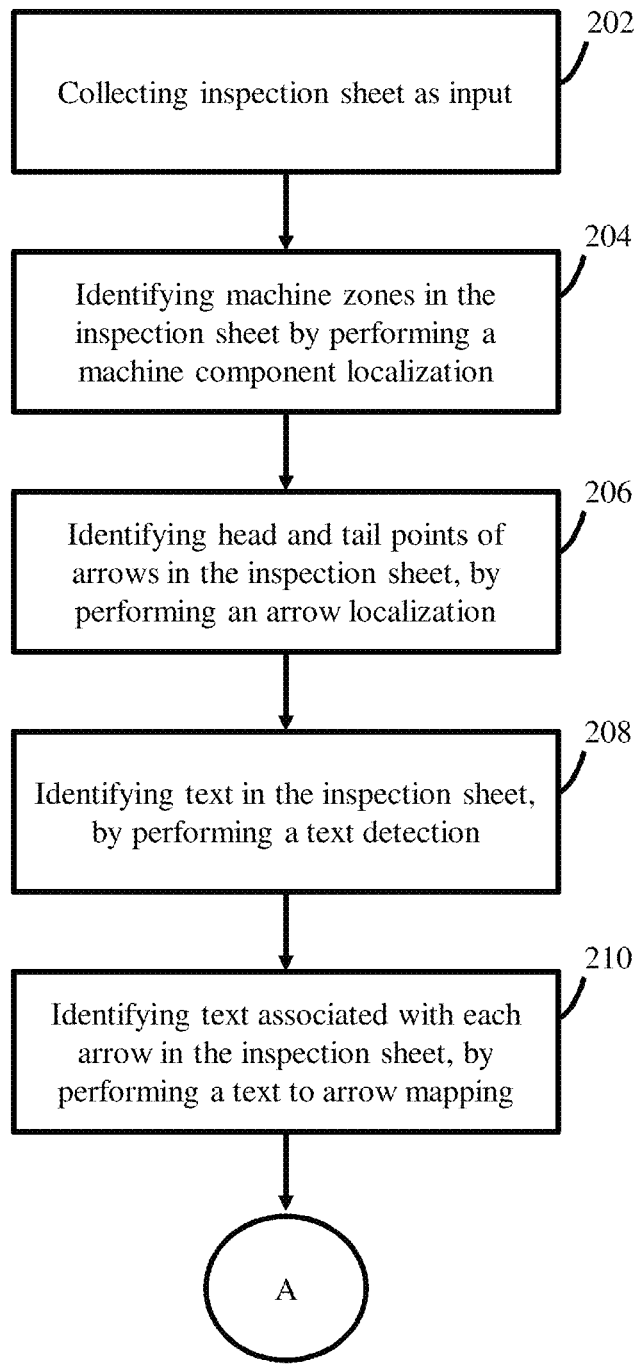
FIG. 2 (consisting of 2a and 2b) is a flow diagram depicting steps involved in the process of document digitization by the document digitization system, according to some embodiments of the present disclosure.
Figure 2B:
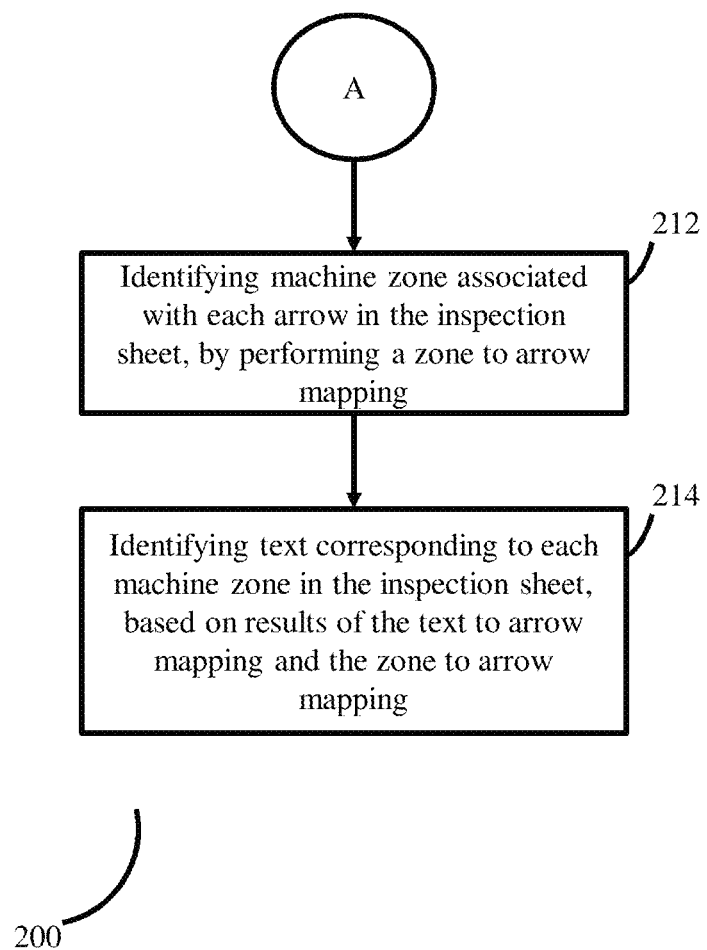

FIG. 2 (consisting of 2a and 2b) is a flow diagram depicting steps involved in the process of document digitization by the document digitization system, according to some embodiments of the present disclosure. The document digitization system 100 collects (202) inspection sheet to be digitized, as input. The document digitization system 100 then processes (204) the collected inspection sheep by performing a zone localization, and identifies machine zones in the sheet. The document digitization system 100 further performs an arrow localization, and identifies (206) head and tail points of the arrows, in the inspection sheet. The document digitization system 100 further identifies (208) text (text segments) in the inspection sheet, by performing a text detection by virtue of a text localization process. The document digitization system 100 then performs a text to arrow mapping, and identifies (210) text that is closest to the tail point of each arrow, and associates the text with corresponding arrows. The document digitization system 100 further performs a zone to arrow mapping and identifies (212) machine zone each arrow is pointing to, and accordingly assigns the arrows to corresponding machine zones. Further, by directly mapping text and machine zone identified as associated with each arrow, text that belongs to each machine zone is identified. Various actions in method 200 can be performed in the order specified, or in any other order as per requirements.

Figure 3:
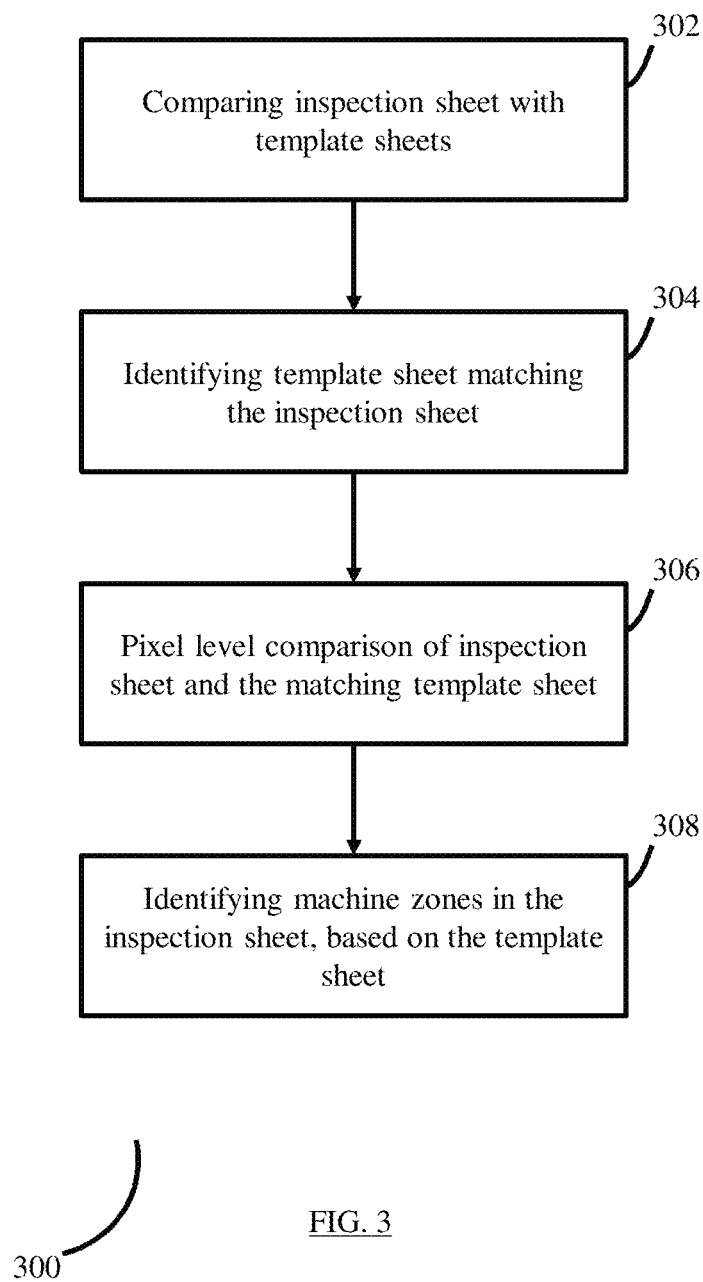
FIG. 3 is a flow diagram depicting steps involved in the process of machine component localization by the document digitization system, according to some embodiments of the present disclosure.

FIG. 3 is a flow diagram depicting steps involved in the process of machine component localization by the document digitization system, according to some embodiments of the present disclosure. The component localization is used to identify machine zones in the line diagrams of machines, present in the inspection sheet. The component localization is performed by the document digitization system 100, using a template matching technique. In this process, the document digitization system 100 compares (302) the inspection sheet with the template sheets stored in the database. Any suitable technique such as sliding window protocol can be used for comparing the documents. Upon identifying (304) a match, that particular template sheet is shortlisted, and further a pixel level comparison of the inspection sheet and the shortlisted template sheet is performed. As the template sheet has machine zones marked as contours, by virtue of the pixel level comparison (306), the document digitization system 100 identifies (308) machine zones in the inspection sheet. In the pixel-level analysis, the component localization module 102 calculates cross correlation metric and then maximizes it over all rows and columns of the inspection sheet. This way, the machine localization helps in identifying zones in the inspection sheet, and corresponding contours also can be identified. Various actions in method 300 can be performed in the order specified, or in any other order as per requirements.

Figure 4:
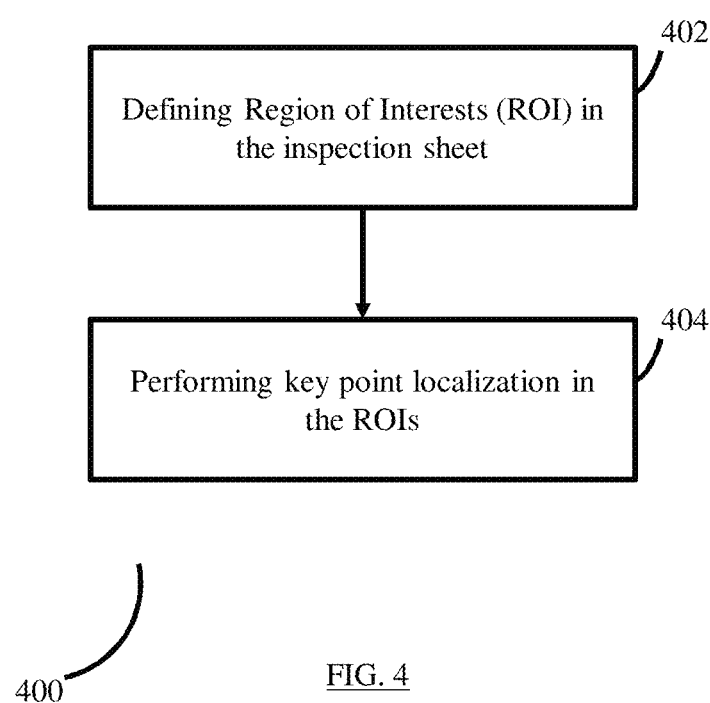
FIG. 4 is a flow diagram depicting steps involved in the process of arrow localization by the document digitization system, according to some embodiments of the present disclosure.

FIG. 4 is a flow diagram depicting steps involved in the process of arrow localization by the document digitization system, according to some embodiments of the present disclosure. In the inspection sheet, arrows are used to link comments added by user and corresponding machine zone in the line diagram provided in the inspection sheet. Arrow localization is performed to identify head and tail points of each arrow, and to also identify direction in which each arrow is pointing.

The document digitization system 100 uses a deep neural network model to learn arrow structure. This step further involves:

1. Identifying Regions of Interest (ROI) in the inspection sheet
2. Localizing arrow head and tail points The ROI refers to a rectangular boundary around all arrows in the inspection sheet. The document digitization system 100 identifies (402) the ROIs in the inspection sheet based on a faster Recurring Convolution Neural network (RCNN) model, which is generated by training the model on multiple inspection sheets. In some scenarios, arrows lie very close to each other, which results in more than one arrow being present in a single ROI. As this can cause confusion while performing the arrow localization, in order to circumvent this issue, the faster RCNN model is trained on partial arrows, wherein 'partial arrow' refers to arrow head and part of shaft attached to the arrow head.

After identifying the ROIs, the document digitization system 100 performs (404) localization of head and tail points for the arrows in the identified ROIs, using a deep Convolution Neural Network (CNN) based regression model to detect the arrow head and tail points. The regression model predicts pixel locations of arrow head and tail points in the inspection sheet, and based on this, the arrow localization module 103 detects direction in which the arrow is pointing. Various actions in method 400 can be performed in the order specified, or in any other order as per requirements.

Figure 5:
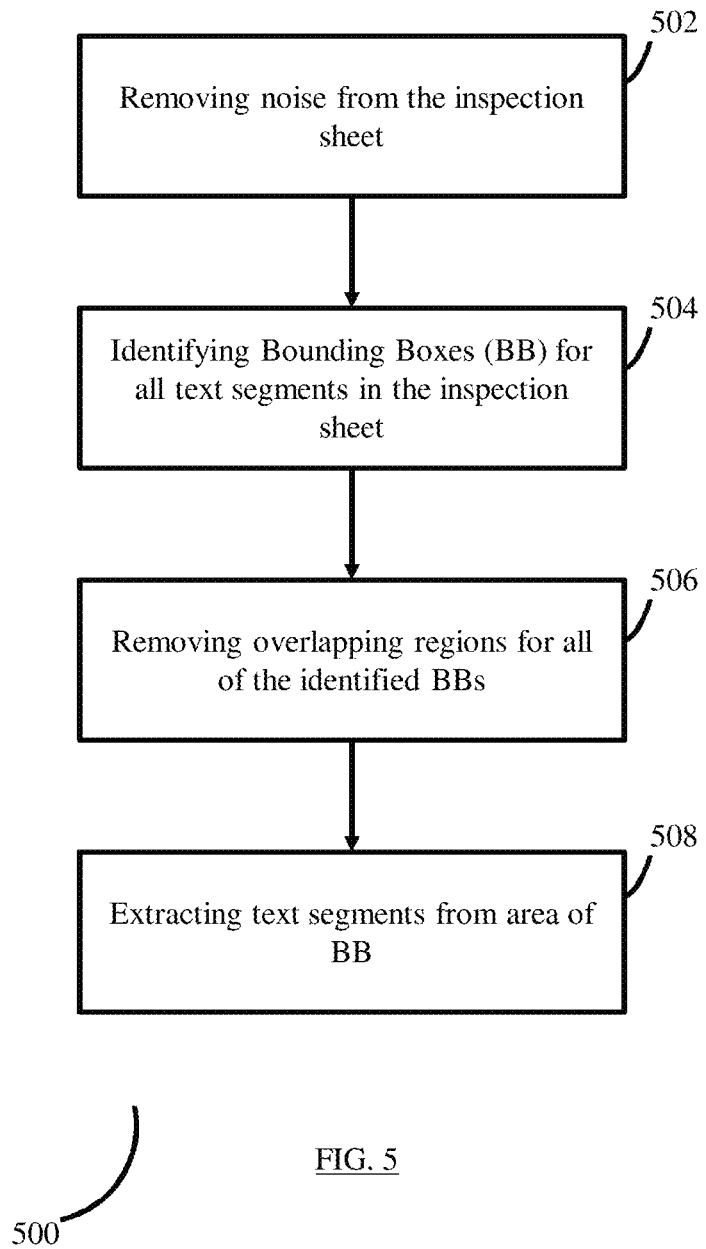
FIG. 5 is a flow diagram depicting steps involved in the process of text detection by the document digitization system, according to some embodiments of the present disclosure.

FIG. 5 is a flow diagram depicting steps involved in the process of text detection by the document digitization system, according to some embodiments of the present disclosure. The document digitization system 100 performs text localization so as to detect texts in the inspection sheet being processed. Initially, the document digitization system 100 removes any unwanted (generic and repetitive) information in the inspection sheet, using background subtraction, which in turn is achieved by virtue of template matching. In this step, the document digitization system 100 subtracts the template sheet identified as matching the inspection sheet, from the inspection sheet; leaving behind only the contents added by the user, in the inspection sheet. After performing the background subtraction, the document digitization system 100 removes (502) noise from the inspection sheet, by using appropriate methodology/algorithm.

After removing the noise, the document digitization system 100 identifies (504) Bounding Boxes (BB) for all text segments and objects present in the inspection sheet. BB are present when the text and/or objects lie adjacent to each other, thus resulting more than one text and/or object present in a single box (in other words, presence of overlapping regions). Further, the overlapping regions are removed (506) using a suitable algorithm, by the document digitization system 100. The text detection module 104 then detects text from area of the identified BB, based on pre-defined upper and lower threshold in terms of pixel values, and further extracts the identified text. Various actions in method 500 can be performed in the order specified, or in any other order as per requirements.

Figure 6:
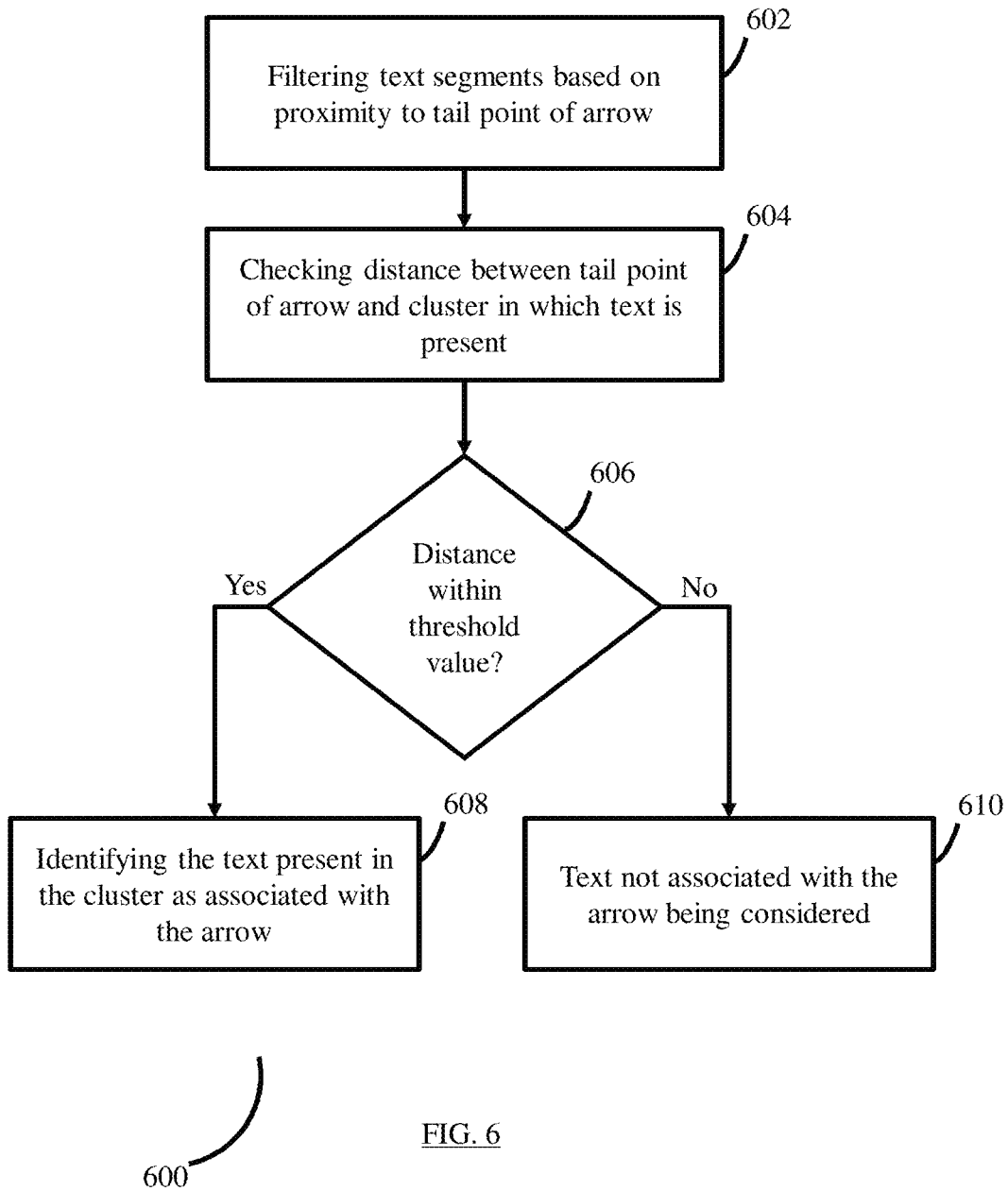
FIG. 6 is a flow diagram depicting steps involved in the process of text to arrow mapping by the document digitization system, according to some embodiments of the present disclosure.

FIG. 6 is a flow diagram depicting steps involved in the process of text to arrow mapping by the document digitization system, according to some embodiments of the present disclosure. The text to arrow mapping is performed to identify text corresponding to all arrows in the inspection sheet. For the document digitization system 100, inputs for performing the text to arrow mapping are head and tail points as well as direction of arrows identified during arrow localization, and text segments identified by the text detection module 104. Assuming that the text is generally located close to tail point of each arrow, the document digitization system 100 filters (602) text based on proximity to the tail point of each arrow being considered. The document digitization system 100 then checks (604) distance between the tail point and the texts being considered. Threshold values in terms of distance of text from tail points or arrows are pre-defined and stored in appropriate database in the memory module 106. In addition to the threshold values of distance, information pertaining to a region with respect to the tail point (in terms of degree) also is defined and stored in the database in the memory module 106. For instance, texts present in only those clusters which are present in a sector of 120 degree (symmetrically or asymmetrically around the line of arrow) with respect to the arrow tail is considered. The value '120 degree' is meant to be only an example, and can change as per requirements. If distance between the text (or cluster) considered and the tail point falls within the threshold value, then the text is identified (608) as associated with the arrow being considered. If multiple clusters identified in the sector being considered, the closest one is selected by the mapping module 105, and the corresponding text is selected and assigned to the arrow. Various actions in method 600 can be performed in the order specified, or in any other order as per requirements.

Figure 7:
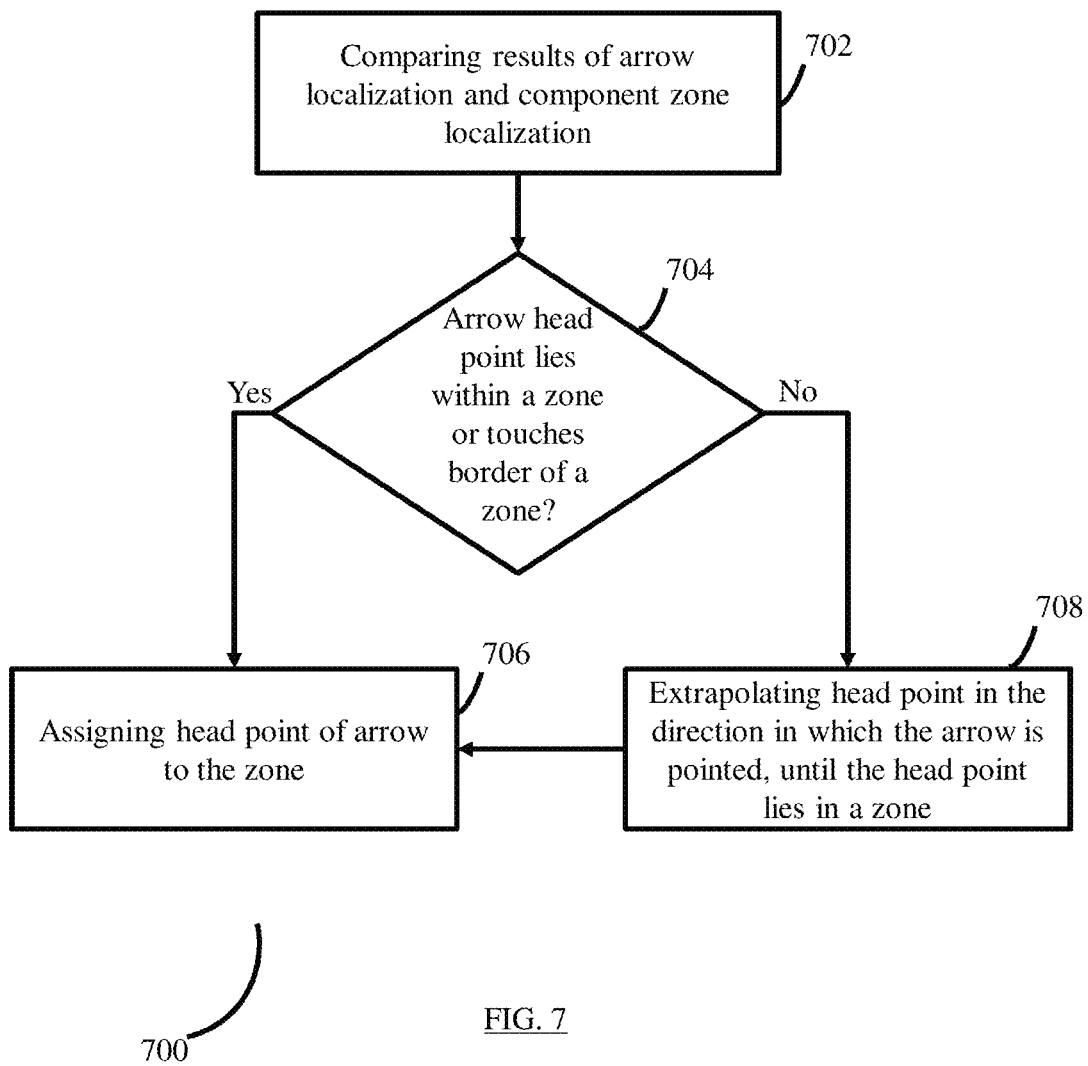
FIG. 7 is a flow diagram depicting steps involved in the process of text to zone mapping by the document digitization system, according to some embodiments of the present disclosure.

FIG. 7 is a flow diagram depicting steps involved in the process of text to zone mapping by the document digitization system, according to some embodiments of the present disclosure. The document digitization system 100, by performing the zone to arrow mapping, identifies machine zone each of the identified arrows are associated with. In this process, the document digitization system 100 maps (702) result of the arrow localization (i.e. the head and tail point information of each arrow) against result of the component zone localization (i.e. the machine zones and contours identified during the machine localization). In this comparison, the document digitization system 100 checks (704) if the head point of the arrow lies inside any zone or is touching borders of any zone. If the head point is identified as not in any machine zone nor is touching boundary of any machine zone, the document digitization system 100 extrapolates (708) the arrow in a direction pointed by the arrow, until the head point is in a zone. Further, the document digitization system 100 assigns (706) head point of each arrow to the corresponding zone identified. For scenarios in which arrow is not pointing in the direction of a zone, but head point is close to boundary of a zone, zone nearest to the head point is selected. Various actions in method 700 can be performed in the order specified, or in any other order as per requirements.

Experimental Results:

A. Dataset

The dataset comprised of 330 camera scans of inspection sheets, out of which 280 were used for training the models being used by the document digitization system 100, and the remaining 50 were used for testing purpose. All inspection sheets were scanned using camera with the same position, orientation and intrinsic parameters, and resolution of each scan was 3120*2200.

B. Test Results

The inspection sheet represented 8 different kinds of machine structures. All these structures contain a total of 86 subparts constituting different zones. Hence, a total of 8 different reference templates were used, which are taken from a random image in the training set. Template matching resulted in the document digitization system 100 finding an exact match. The Faster-RCNN was trained on the manually annotated arrow images from the complete training set using the Zeiler-Fergus network with random weight initialization. This network was trained for 20000; 10000; 20000 and 10000 epochs, respectively for Stage1 RPN, Stage1 RCNN, Stage2 RPN and Stage2 RCNN. Rest of the training settings were taken as default. Accuracy is calculated as the percentage of correctly obtained ROIs out of the total arrows present in the test set. By keeping a confidence threshold greater than 0:9 and Non Maximal Suppression (NMS) threshold less than 0:05, the models used in the document digitization system 100 is able to detect 171 correct ROIs out of 179 and 3 of the detections were obtained as false positives. The ROI detection is assumed to be correct if it fully contains the arrow head. The accuracy obtained for Faster-RCNN is 95.5% (Refer Table I). It was observed that the accuracy obtained is significantly high and 8 arrow regions which failed to be detected were among the ones having closely drawn arrows, and hence affected by the strict NMS kept for maintaining minimal false positive rate.

Cropped images of partial arrows, taken from the training set is used to train the Deep CNN regression model. There were total of 1000 arrow images, which were divided randomly into 800 and 200 sets for training and validation, respectively. The model comprises of 5 convolution layers with 8; 16; 32; 32 and 64 filters respectively, followed by 2 fully connected layers. Each layer except the last fully connected layer uses Rectified Linear Units (ReLU) as their activation function. Each convolution layer is followed by a Max-pool layer of size 2*2. Each convolution layer uses 3*3 kernel sized filters. The last fully connected layer has 4 hidden units representing x and y location of the arrow head and tail. It uses a linear activation function. Adam optimizer with default hyper-parameters was used to optimize mean square error cost function.

The number of epochs used in training was 500, which helped in achieving highest validation accuracy. Input size of images were 150*150. During testing, a mean square error of 170.3 was obtained for a set of 171 ROI images obtained from Faster RCNN. It implies a circle of radius of approximately 13 pixels in the image plane where the expected outcome would lie. If manually annotated ROIs on test set are given, the network gives mean square error of 148.1 for a set of 179 ROI images. It depicts the absolute error measure of the Deep CNN regression model.

Output from arrow localization is used for text detection. Accuracy of the detected text box was detected by finding Intersection of Union (IoU) between annotated text box and obtained text box. IoU threshold was set to be 0:9. Based on this, 157 correct text boxes were extracted at arrow tail out of 171 detected arrows (ROIs) by Faster RCNN. This indicates an accuracy of 91.8%. With the manually annotated ROIs and arrow head and tail points on inspection sheets selected for testing, 166 correct text boxes were extracted at the arrow tail out of 179 arrows. This yields an accuracy of 92.7%, which is the absolute error measure of text detection.

Next, one-to-one mapping from arrows to the machine zones was performed. The document digitization system could map 162 arrows correctly to their corresponding zones out of the 171 detected arrows, thereby obtaining an accuracy of 94.7%. The accuracy of zone mapping depends largely on the accuracy of head and tail point localization. With manually annotated ROIs and arrow head-tail points on the test set (which comprises of the inspection sheets selected for testing), 178 arrows were mapped correctly to their corresponding zone out of the set of 179 arrows. Hence according to the absolute error measure, it amounts to 99.4% accuracy.

It is to be noted that the error at each step of the document digitization gets cascaded into the next step, and thus the overall error is a reflection of the cumulative error across every stage in the pipeline. Final end to end accuracy of the document digitization system, therefore, is expected to be lower than the accuracy at any of the individual stages. Ratio of successful text-region zone pairs with ideal text-region zone pairs present in the inspection sheet is calculated, and a successful text-region zone pair is defined as the number of detected text-region with IoU>0:9 mapped to arrows and subsequently to the correct zone. There were a total of 149 successful cases out of 179 cases, and hence the end to end accuracy is approx. 83.2%. Accuracy of the final mapping also was evaluated, given annotated ROIs and arrow head and tail points on test set. In this case, there are total 165 successful cases out of 179 total cases, which amounts to an accuracy rate of 92.1%.

Number of test cases and percentage of accuracy at each stage are provided in Table. 1.

TABLE 1

| Method/step | Results at each stage | | Results of individual component | |
|---|---|---|---|---|
| | Successful cases | Accuracy (%) | Successful cases | Accuracy (%) |
| Arrow detection (Faster RCNN) | 171/179 | 95.5 | 171/179 | 95.5 |
| Text to arrow | 157/171 | 91.8 | 166/179 | 92.7 |
| Zone to arrow mapping | 162/171 | 94.7 | 178/179 | 99.4 |
| Text to zone mapping | 149/179 | 83.2 | 165/179 | 92.1 |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
   collecting an inspection sheet as input, via one or more hardware processors, by a document digitization system;
   performing, via the one or more hardware processors, a component localization of one or more line diagrams in the inspection sheet, by the document digitization system, wherein the component localization involves identification and classification of different machine zones in the one or more line diagrams, wherein the component localization comprises:
  performing a pixel level comparison of the inspection sheet with a plurality of template sheets stored in a database associated with the document digitization system, wherein said plurality of template sheets have one or more line diagrams with zones represented as contours;
  identifying at least one template sheet as matching with the inspection sheet; and
  identifying different machine zones in the inspection sheet, based on the contours defined in the template sheet that is identified as the template sheet matching with the inspection sheet;
performing, via the one or more hardware processors, an arrow head-tail localization of the one or more line diagrams in the inspection sheet, by the document digitization system, wherein the arrow head-tail localization involves identifying arrow head and tail points in the inspection sheet, for all arrows present in the inspection sheet;
performing, via the one or more hardware processors, text detection in the inspection sheet, by the document digitization system, wherein the text detection involves detection of all texts in the inspection sheet, and position of identified text with respect to one or more clusters in the inspection sheet;
performing, via the one or more hardware processors, a text to arrow mapping, by the document digitization system, wherein the text to arrow mapping is based on the identified head and tail points of arrows and position of cluster in which the text is present;
performing, via the one or more hardware processors, a zone to arrow mapping, by the document digitization system, wherein the zone to arrow mapping is based on the identified head and tail points of arrows and machine zones identified during the component localization; and
identifying text corresponding to different machine zones, based on result of the text to arrow mapping and zone to arrow mapping, via the one or more hardware processors, by the document digitization system.

2. The method as claimed in claim 1, wherein performing the arrow head-tail localization comprises of:
  defining a plurality of Region of Interests (ROI) in the inspection sheet, by the document digitization system; and
  performing a key point localization in said plurality of ROIs, by the document digitization system, wherein head and tail points of all arrows present in the ROIs are identified by performing the key point localization.

3. The method as claimed in claim 1, wherein performing the text detection comprises of:
  removing noise from the inspection sheet, by the document digitization system;
  identifying all Bounding Boxes (BB) for all text segments and objects present in the inspection sheet, by the document digitization system;
  removing overlapping regions for all the Bounding Boxes identified, by the document digitization system; and
  extracting text segments from area of the BB, by the document digitization system.

4. The method as claimed in claim 1, wherein performing the text to arrow mapping comprises of:
  filtering text segments extracted during the text detection, based on proximity to tail point of one or more arrows, by the document digitization system; and
  identifying text present in a cluster closest to an arrow as the text associated with that particular arrow, by the document digitization system.

5. The method as claimed in claim 1, wherein performing the zone to arrow mapping comprises of:
  comparing head and tail points identified during the arrow head-tail localization with machine zones identified during the zone localization, by the document digitization system;
  determining whether head point of any arrow lies inside a machine zone or is touching borders of a machine zone, by the document digitization system;
  extrapolating the head point in a direction which the arrow points to, until the head point lies inside a machine zone, if the head point is identified as not laying inside any machine zone, by the document digitization system; and
  assigning the head point of an arrow to a machine zone, if the head point is identified as laying inside or is touching borders of that particular machine zone, by the document digitization system.

6. The method as claimed in claim 1, wherein identifying text corresponding to different machine zones based on result of the text to arrow mapping and zone to arrow mapping, comprises of directly mapping text and machine zone associated with an arrow.

7. A document digitization system, comprising:
  a processor; and
  a memory module comprising a plurality of instructions, said plurality of instructions configured to cause the processor to:
    collect an inspection sheet as input, via one or more hardware processors, by an Input/Output (I/O) module of the document digitization system;
    perform a component localization of one or more line diagrams in the inspection sheet, by a component localization module of the document digitization system, wherein the component localization involves identification and classification of different machine zones in the one or more line diagrams, wherein the component localization comprises:
      performing a pixel level comparison of comparing the inspection sheet with a plurality of template sheets stored in a database associated with the document digitization system, wherein said plurality of template sheets have one or more line diagrams with zones represented as contours:
      identifying at least one template sheet as matching with the inspection sheet; and
      identifying different machine zones in the inspection sheet, based on the contours defined in the template sheet that is identified as the template sheet matching with the inspection sheet;
    perform an arrow head-tail localization of the one or more line diagrams in the inspection sheet, by an arrow localization module of the document digitization system, wherein the arrow head-tail localization involves identifying arrow head and tail points in the inspection sheet, for all arrows present in the inspection sheet;
    perform text detection in the inspection sheet, by a text detection module of the document digitization system, wherein the text detection involves detection of all texts in the inspection sheet, and position of identified text with respect to one or more clusters in the inspection sheet;

perform a text to arrow mapping, by a mapping module of the document digitization system, wherein the text to arrow mapping is based on the identified head and tail points of arrows and position of cluster in which the text is present;

perform a zone to arrow mapping, by the mapping module, wherein the zone to arrow mapping is based on the identified head and tail points of arrows and machine zones identified during the component localization; and identify text corresponding to different machine zones, based on result of the text to arrow mapping and zone to arrow mapping, by the mapping module.

8. The document digitization system as claimed in claim 7, wherein the arrow localization module performs the zone localization by:

defining a plurality of Region of Interests (ROI) in the inspection sheet, by the document digitization system; and performing a key point localization in said plurality of ROIs, by the document digitization system, wherein head and tail points of all arrows present in the ROIs are identified by performing the key point localization.

9. The document digitization system as claimed in claim 7, wherein the text detection module performs the text detection by:

removing noise from the inspection sheet, by the document digitization system;

identifying all Bounding Boxes (BB) for all text segments and objects present in the inspection sheet, by the document digitization system;

removing overlapping regions for all the Bounding Boxes identified, by the document digitization system; and extracting text segments from area of the BB, by the document digitization system.

10. The document digitization system as claimed in claim 7, wherein the mapping module performs the text to arrow mapping by:

filtering text segments extracted during the text detection, based on proximity to tail point of one or more arrows; and identifying text present in a cluster closest to an arrow as the text associated with that particular arrow.

11. The document digitization system as claimed in claim 7, wherein the mapping module performs the zone to arrow mapping by:

comparing head and tail points identified during the arrow head-tail localization with machine zones identified during the zone localization, by the document digitization system;

determining whether head point of any arrow lies inside a machine zone or is touching borders of a machine zone, by the document digitization system;

extrapolating the head point in a direction which the arrow points to, until the head point lies inside a machine zone, if the head point is identified as not laying inside any machine zone, by the document digitization system; and assigning the head point of an arrow to a machine zone, if the head point is identified as laying inside or is touching borders of that particular machine zone, by the document digitization system.

12. The document digitization system as claimed in claim 7, wherein the mapping module identifies text corresponding to different machine zones based on the results of the text to arrow mapping and zone to arrow mapping by directly mapping text and machine zone associated with an arrow.

13. One or more non-transitory machine readable information storage mediums comprising one or more instructions which when executed by one or more hardware processors causes:

collecting an inspection sheet as input;

performing a component localization of one or more line diagrams in the inspection sheet, wherein the component localization involves identification and classification of different machine zones in the one or more line diagrams, wherein the component localization comprises:

performing a pixel level comparison of the inspection sheet with a plurality of template sheets stored in a database associated with the document digitization system, wherein said plurality of template sheets have one or more line diagrams with zones represented as contours;

identifying at least one template sheet as matching with the inspection sheet; and identifying different machine zones in the inspection sheet, based on the contours defined in the template sheet that is identified as the template sheet matching with the inspection sheet;

performing an arrow head-tail localization of the one or more line diagrams in the inspection sheet, wherein the arrow head-tail localization involves identifying arrow head and tail points in the inspection sheet, for all arrows present in the inspection sheet;

performing text detection in the inspection sheet, wherein the text detection involves detection of all texts in the inspection sheet, and position of identified text with respect to one or more clusters in the inspection sheet;

performing a text to arrow mapping, wherein the text to arrow mapping is based on the identified head and tail points of arrows and position of cluster in which the text is present;

performing a zone to arrow mapping, wherein the zone to arrow mapping is based on the identified head and tail points of arrows and machine zones identified during the component localization; and identifying text corresponding to different machine zones, based on result of the text to arrow mapping and zone to arrow mapping.

14. The one or more non-transitory machine readable information storage mediums of claim 13, wherein the one or more instructions which when executed by the one or more hardware processors for the text detection cause:

removing noise from the inspection sheet, by the document digitization system;

identifying all Bounding Boxes (BB) for all text segments and objects present in the inspection sheet, by the document digitization system;

removing overlapping regions for all the Bounding Boxes identified, by the document digitization system; and extracting text segments from area of the BB, by the document digitization system.

15. The one or more non-transitory machine readable information storage mediums of claim 13, wherein the one or more instructions which when executed by the one or more hardware processors for performing the text to arrow mapping cause:

filtering text segments extracted during the text detection, based on proximity to tail point of one or more arrows, by the document digitization system; and identifying text present in a cluster closest to an arrow as the text associated with that particular arrow, by the document digitization system.

16. The one or more non-transitory machine readable information storage mediums of claim 13, wherein the one or more instructions which when executed by the one or more hardware processors for performing the zone to arrow mapping cause:
   comparing head and tail points identified during the arrow head-tail localization with machine zones identified during the zone localization, by the document digitization system;
   determining whether head point of any arrow lies inside a machine zone or is touching borders of a machine zone, by the document digitization system;
   extrapolating the head point in a direction which the arrow points to, until the head point lies inside a machine zone, if the head point is identified as not laying inside any machine zone, by the document digitization system; and
   assigning the head point of an arrow to a machine zone, if the head point is identified as laying inside or is touching borders of that particular machine zone, by the document digitization system.

17. The one or more non-transitory machine readable information storage mediums of claim 13, wherein the one or more instructions which when executed by the one or more hardware processors for identifying text corresponding to different machine zones based on result of the text to arrow mapping and zone to arrow mapping cause direct mapping of text and machine zone associated with an arrow.

* * * * *